(12) United States Patent
Hong et al.

(10) Patent No.: US 6,775,459 B2
(45) Date of Patent: Aug. 10, 2004

(54) VARIABLE OPTICAL ATTENUATOR

(75) Inventors: Yoon Shik Hong, Sungnam-Shi (KR); Yong San Shin, Kyoungsangnam-Do (KR); Young Yun Kim, Kyoungsangnam-Do (KR); Jong Hyun Lee, Kwangju-Shi (KR); Sung Cheon Jung, Seoul (KR); Jung Hyun Lee, Suwon-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 124 days.

(21) Appl. No.: 10/193,004

(22) Filed: Jul. 10, 2002

(65) Prior Publication Data
US 2003/0161408 A1 Aug. 28, 2003

(30) Foreign Application Priority Data
Feb. 27, 2002 (KR) ........................................ 2002-10379

(51) Int. Cl.$^7$ ................................................. G02B 6/00
(52) U.S. Cl. ........................... 385/140; 385/18; 385/19; 385/31
(58) Field of Search ............................... 385/15–25, 31, 385/140

(56) References Cited

U.S. PATENT DOCUMENTS

| | | | | |
|---|---|---|---|---|
| 6,173,105 B1 | * | 1/2001 | Aksyuk et al. | 385/140 |
| 6,301,425 B1 | * | 10/2001 | Espindola et al. | 385/140 |
| 6,459,845 B1 | * | 10/2002 | Lee et al. | 385/140 |

* cited by examiner

Primary Examiner—Phan T. H. Palmer
(74) Attorney, Agent, or Firm—Darby & Darby

(57) ABSTRACT

Disclosed is a variable optical attenuator comprising: a transmitting fiber for transmitting light; a receiving fiber concentrically placed with said transmitting fiber for absorbing light; a shutter between said transmitting fiber and said receiving fiber for absorbing light to adjust optical transmittance; and an actuator for driving said shutter. The size and price of the optical attenuator is remarkably reduced compared to a conventional mechanical connector-type attenuator to provide an article excellent in competitive edge.

8 Claims, 4 Drawing Sheets

VARIABLE OPTICAL ATTENUATOR

BACKGROUND OF THE INVENTION

1. Field of the Invention

The present invention relates to a variable optical attenuator, in particular, which has a variable waveguide for absorbing light to enable attenuation.

In general, the optical signal attenuator for optical communication is an optical component having a set of input and output terminals, by which incident light undergoes a certain magnitude of optical loss to radiate via the output terminal with attenuated optical power.

In optical communication, a system structure varies the level of received optical power which is determined according to the number and performance of optical components such as coupling of optical dividers used in a transmission line, the difference of transmission loss of an optical fiber due to transmission length and the number of optical fiber connecting portions.

If the level of optical input is excessive, an optical attenuator is used to adjust the optical input level. The optical attenuator has other representative uses such as evaluation, adjustment, correction and the like in respect to communication devices or optical measuring devices.

The optical attenuator may be generally divided into a fixed optical attenuator obtaining a fixed amount of attenuation and a variable optical attenuator capable of changing the amount of attenuation. It is necessary for any type of optical attenuator that the amount of attenuation may be not changed by a large amount according to wavelength in a usable range of wavelength.

2. Description of the Related Art

Typical variable optical attenuators of the prior art are divided into a waveguide-type attenuator mainly using a thermo-optic effect of a silicon- or polymer-based material, a large-sized mechanical connector-type attenuator and an MEMS optical-attenuator using an MEMS actuator.

The variable optical attenuators each will be explained as follows.

In general, the waveguide-type variable attenuator has a optical attenuation principle, in which an optical signal is attenuated by forming flat waveguides made of silicon or polymer and changing the temperature distribution of the waveguides by using electrodes while adjusting light absorbing rates of the waveguides. The waveguide-type variable optical attenuator is adequate to small-sized articles, however, they have drawbacks in performance such as large amount of polarization-dependent loss and wavelength dependency.

In the meantime, the mechanical connector-type attenuator achieves optical attenuation according to one of methods, in which an optical fiber is directly deformed to produce transmission loss due to macro bending or the connection distance between transmitting and receiving optical fibers is varied to produce insertion loss. The mechanical connector-type attenuator has a wide range of available wavelength due to no wavelength dependency. However, the above attenuator has disadvantages such as large article size and high cost.

In order to overcome the above disadvantages, the variable optical attenuator using the MEMS actuator has been actively developed. Currently developed MEMS variable optical attenuators include a shutter-type attenuator, a tilting micromirror-type attenuator, a Mechanical Anti-Reflection Switch (MARS) attenuator and the like.

First, the MARS variable optical attenuator functions to adjust the amount of attenuation by positioning a membrane of a mechanical anti-reflection switch based upon the Fabry-Pero principle in an arbitrary displacement rather than On or Off position. The MARS variable optical attenuator has a disadvantage that the amount of attenuation is varied according to wavelength.

The shutter-type MEMS variable optical attenuator has a shutter 103 or 203 placed between a transmitting fiber 101 or 201 and receiving fiber 102 or 202 as shown in FIGS. 1 and 2. The connecting area between the two optical fibers is adjusted according to the displacement of the shutter to control insertion loss. The shutter-type MEMS variable optical attenuator has disadvantages as follows: The first conventional example as shown in FIG. 1 confronts a problem of retroreflection due to an optical signal returning reflected from the shutter; and the second conventional example as shown in FIG. 2 confronts scattering and refraction due to scattered reflection. FIGS. 3 and 4 respectively show effects at the shutters of the variable optical attenuators of the prior art.

Although the shutters of the prior art operate as shown in FIGS. 3 and 4, scattering may take place due to the coarseness and process irregularity of the shutter face. This may cause problems such as retroreflection and scattered reflection in which light propagates across into a transmitting unit or other component by an undesired quantity so that the amount of reflection due to the shutter should be minimized.

The last tilting micromirror-type attenuator connects between the transmitting and receiving optical fibers using reflection of a mirror and controls insertion loss with each displacement of the mirror. The tilting micromirror-type attenuator requires manufacture of a tilting micromirror and a structure of vertically arranging the micromirror on a substrate thereby resulting in a difficult packaging process for assembling the optical fibers by vertically aligning the same in respect to the substrate.

SUMMARY OF THE INVENTION

Accordingly the present invention has been made to solve the above problems of the prior art and it is therefore an object of the present invention to provide a variable optical attenuator adopting an MEMS drive mode which prevents efficiency degradation due to scattering of a conventional shutter while simplifies a manufacturing structure in order to improve the performance of a conventional optical attenuator.

According to an aspect of the invention it is provided a variable optical attenuator of the invention comprising: a transmitting fiber for transmitting light; a receiving fiber concentrically arranged with the transmitting fiber for absorbing light; a shutter between the transmitting fiber and the receiving fiber for absorbing light to extinguish absorbed light in areas having no relation to the transmitting or receiving fiber after total-reflection propagation of light inside thereof; an actuator for driving the shutter; and a substrate for supporting the above components.

DETAILED DESCRIPTION OF THE PREFERRED EMBODIMENTS

Figure 1:
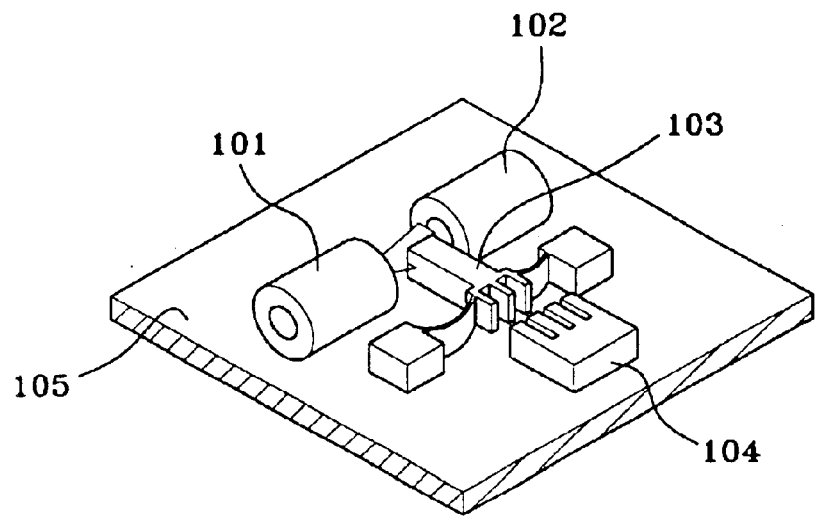
FIGS. 1 and 2 are perspective views illustrating variable optical attenuators of the prior art.
Figure 2:
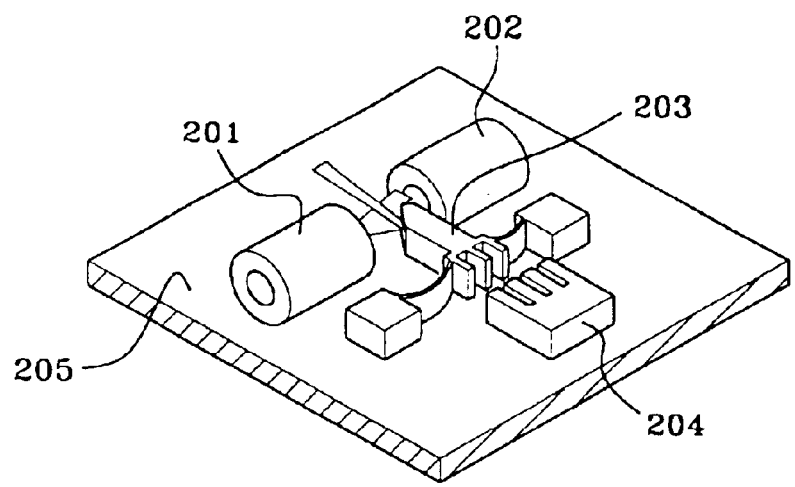
Figure 3:
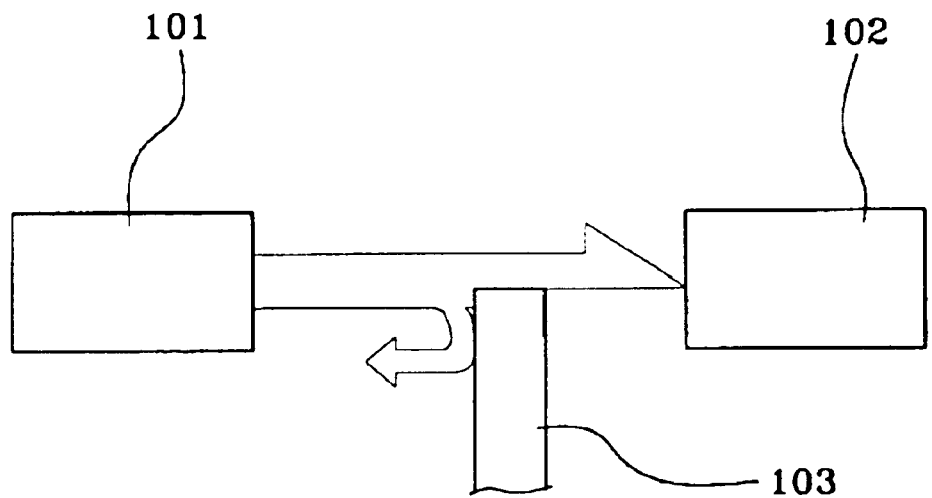
FIGS. 3 and 4 are schematic views illustrating optical propagation in variable optical attenuators of the prior art.
Figure 4:
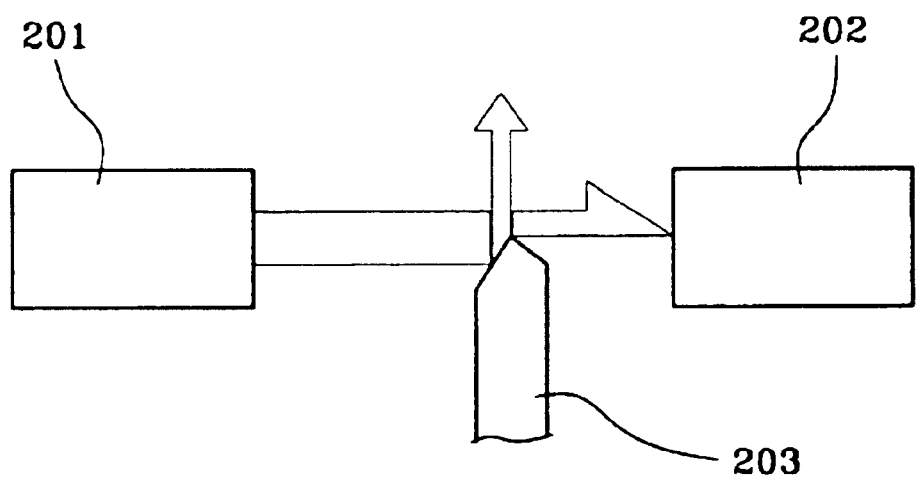

A variable optical attenuator of the invention is characterized in comprising: a transmitting fiber for transmitting light; a receiving fiber concentrically placed with the transmitting fiber for absorbing light; a shutter between the transmitting fiber and the receiving fiber for absorbing light to extinguish absorbed light in areas having no relation to the transmitting or receiving fiber after total-reflection propagation of light inside thereof; an actuator for driving the shutter; and a substrate for supporting the above components.

It is preferred that the shutter is made of silicon.

It is also preferred that silicon is formed through anisotropic dry etching.

Also, it is preferred that the shutter comprises an external reflection area, an internal total-reflection area and an extinguishing area from the leading end. More preferably, the external reflection area is shaped as a wedge, the internal total-reflection area is shaped as a rectangle, and the extinguishing area is shaped as a wedge.

According to the features of the variable optical fiber of the invention, the waveguide made of silicon functioning as the shutter is provided between the transmitting fiber and the receiving fiber to attenuate light.

The variable optical attenuator of the invention absorbs a portion of light from the transmitting fiber to be transmitted through the same while outwardly reflects the remaining portion of light, in which the absorbed portion of light is transferred along the inside of the optical attenuator via total-reflection and extinguished in areas having no relation to the transmitting and receiving fibers.

In other words, according to the variable optical attenuator of the invention, the portion of light filtered by the leading end of the shutter made of silicon enters the receiving fiber to finally result in an attenuation effect preventing diffraction and scattering of light which may occur during the above attenuating process.

The variable optical attenuator of the invention minimizes light due to retroreflection and scattering which influences the efficiency of light returning from the waveguide into the transmitting fiber from the waveguide based upon a variable shutter structure made of silicon without a metal thin film, and extinguishes an absorbed portion of an optical signal along the waveguide shaped as a micro-structure of silicon shutter.

The variable optical attenuator has a structure that the two fixed optical fibers are opposed to each other with an interval where the movable silicon shutter is placed. The variable optical fiber utilizes the principle of absorbing a portion of incident light into the silicon waveguide, where the absorbed portion of incident light is continuously extinguished.

However, when the optical extinguishing feature is analyzed based upon a ray-tracing method, a long length of at least 80 mm is necessary for obtaining attenuation of 40 dB only inside the waveguide having an absorbing coefficient of 1.05/cm. This causes problems to manufacture of the optical attenuator via an MEMS process.

Figure 6:
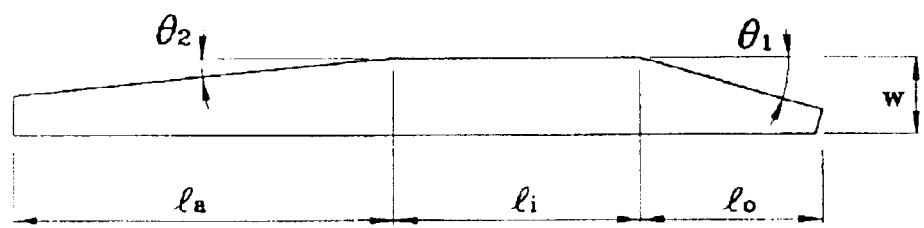
FIG. 6 is a magnification illustrating the shape of a shutter made of silicon of a variable optical attenuator according to a preferred embodiment of the invention.

For the purpose of solving the above problem, a novel optical attenuating method is proposed to establish a condition in which proper angles are formed in lower portions, as shown in FIG. 6, so that no more total-reflection takes place while light enters. Therefore, light entered the shutter is repeatedly extinguished inside the silicon shutter in directions having no relation to the transmitting or receiving fiber so that desired attenuation can be obtained without forming a long waveguide.

Figure 5:
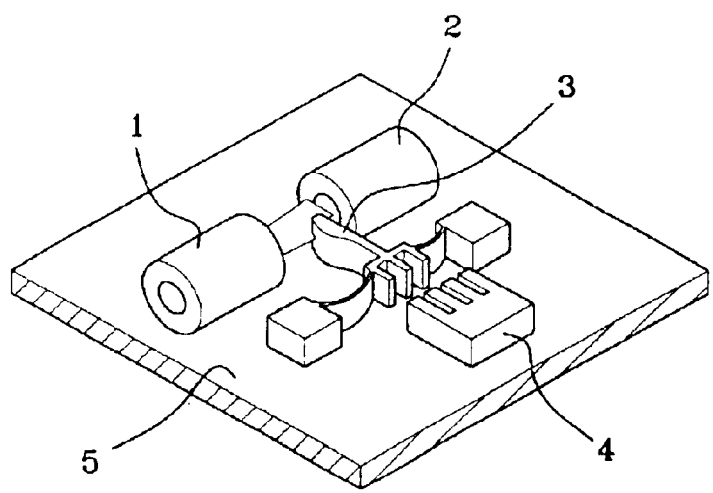
FIG. 5 is a perspective view illustrating a variable optical attenuator of the invention.

Hereinafter the features of the invention will be described in detail in reference to the accompanying drawings, in which: FIG. 5 is a perspective view illustrating a variable optical attenuator of the invention, and FIG. 6 is a magnification illustrating the shape of a shutter made of silicon of the variable optical attenuator of the invention.

The shutter shown in FIG. 5 has the shape of a wedge, and FIG. 6 shows the shape of the shutter in detail.

As shown in FIG. 6, a portion (e.g. 70%) of incident light entering the leading end of the shutter propagates to the inside of the shutter made of the silicon waveguide, whereas the remaining portion of about 30% is reflected. In this case, the reflection angle of light is so designed that incident light may not propagate into the optical fibers, thereby avoiding the influence of light on input and output terminals. In practice, light within a light-receiving angle of the optical fibers due to refraction or scattering may have an effect on the input and output terminals. However, the inventive variable optical attenuator having the waveguide using the shutter made of silicon reflects about 30% of incident light in respect to a conventional shutter-type attenuator having a reflecting face made of a metal which reflects the entire portion of light, thereby reducing the influence due to scattering and diffraction. Scattering and diffraction may cause polarization-dependent loss and wavelength-dependent loss of the optical attenuator, and accordingly it is advantageous to minimize the same.

The shutter functioning as the silicon waveguide as set forth above is basically divided into an external reflection area, an internal total-reflection area and an extinguishing area from the leading end, in which the external reflection area is shaped as a wedge, the internal total-reflection area is shaped as a rectangle, and the extinguishing area is shaped as a wedge as shown in FIG. 6. Incident light entering the wedge-shaped external reflection area is totally reflected and guided to propagate into the internal total-reflection area. In the external reflection area, incident light is uninterruptedly attenuated since it has an incident angle of $\theta_1$ smaller than a critical angle. Further, an extinguishing efficiency is raised due to continuous attenuation and transmission occurring as incident light propagates along the internal total-reflection area. The variable waveguide made of silicon has an inclination angle $\theta_2$ at an interfering face between the internal total-reflection area and the extinguishing area for obtaining uninterrupted attenuation. Due to the angles $\theta_1$ and $\theta_2$, a portion of the optical signal is allowed to transmit into the variable waveguide made of silicon, and the transmitted optical signal is effectively attenuated.

In other words, the partial optical signal refracted in an inclined portion of the leading end, e.g. external reflection area, is transferred into the shutter-type variable waveguide, and the remaining portion of the optical signal is reflected without an influence on the optical fiber. Transferred light is extinguished according to each step, in which extinguished light discharges through transmission from those areas of the input and output terminals having no effect on the optical fiber. Accordingly light can be attenuated regardless of the transmitting/receiving signals.

In the meantime, for the purpose of realizing an embodiment of the invention, the external area, the internal total-reflection area and the extinguishing area have length parameters $l_p$, $l_i$ and $l_a$, respectively, and the shutter has a width parameter w. The shape of the shutter is determined according to the geometric association of the above parameters, which are influenced from the optical fiber, the air and the refraction index of the silicon shutter.

In the meantime, the variable optical attenuator of the invention employs the shutter made of the silicon variable waveguide, and accordingly is not coated with a metal. Therefore, the quantity of light reflected in the embodiment of the invention is reduced up to 30% in respect to a conventional attenuator where metal is coated.

Figure 7:
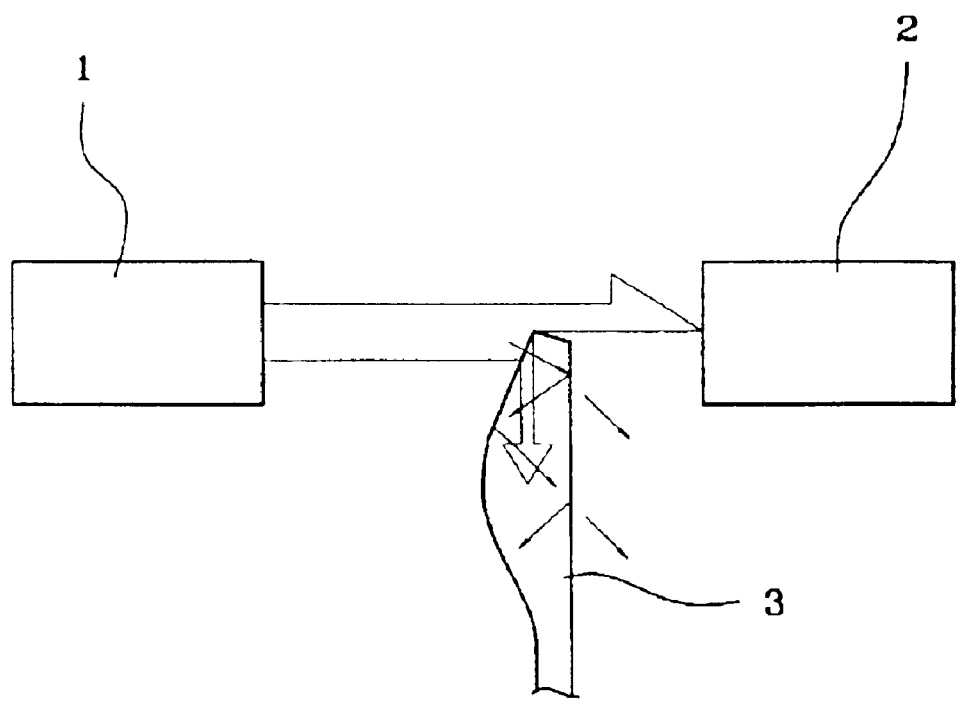
FIG. 7 is a schematic view illustrating optical propagation in a variable optical attenuator of the invention.

FIG. 7 is a schematic view illustrating optical propagation in a variable optical attenuator of the invention.

As shown in FIG. 7, the incident optical signal is divided into two portions, i.e. the first partial signal filtered by the silicon waveguide and the second partial signal freely propagating into the output terminal. The filtered first partial signal partially transmits the interfering face placed at the leading end of the silicon waveguide from which the remaining portion of the filtered first partial signal is reflected. The filtered first partial signal has a transmissivity of about 70% into the silicon waveguide.

As set forth above, the shutter-type variable optical attenuator made of silicon of the invention has extraordinarily excellent performance in loss features, wavelength dependency and downsizing ability over conventional optical attenuators such as variable optical attenuators having other driving modes and MEMS mode variable optical attenuators.

In other words, the variable optical attenuator of the invention may not need a metal processing for the silicon variable waveguide unlike a conventional interrupting variable optical attenuator thereby enabling simplification of a manufacturing process thereof.

In the variable optical attenuator of the invention, the quantity of light reflected from the silicon waveguide is about 30% of in respect to a conventional metal shutter thereby reducing the influence of retroreflection and variation in attenuating quantity. Attenuated light introduced into the silicon waveguide is extinguished while repeating reflection and transmission in the attenuating areas of the waveguide which has no effect on transmitting and receiving portions.

The optical attenuator of the invention is less in wavelength dependency and processing insertion loss compared to a conventional PLC waveguide variable optical attenuator or an MARS variable optical attenuator, and in polarization loss due to the reflecting face compared to a conventional structure using a mirror. Further, the inventive optical attenuator can be developed as an article cheaper and smaller-sized compared to a mechanical variable optical attenuator. A simple manufacturing process and excellent performance can be expected based upon the principle, in which the shutter-type variable waveguide made of silicon without a metal thin film coating process is driven with the MEMS actuator.

Further, the size and price of the optical attenuator is remarkably reduced compared to the conventional mechanical connector-type attenuator to provide an article excellent in competitive edge.

Although the preferred embodiment of the present invention has been disclosed for illustrative purposes, those skilled in the art will appreciate that various modifications, additions and substitutions can be made without departing from the scope and spirit of the invention as disclosed in the accompanying claims. In addition, while the shutter is made of silicon according to the embodiment of the invention, the shutter can be made of other material having the same or similar properties. Further, the reflecting and incident rates at the shutter can be realized with various forms.

What is claimed is:

1. A variable optical attenuator comprising:

spaced transmitting and receiving fibers aligned for optical communication;

a shutter between said transmitting fiber and said receiving fiber to adjust optical transmittance; and an actuator for driving said shutter;

said shutter having an optical axis and comprising:
    a substantially rectangular internal total-reflection area;
    an external reflection area formed from said internal total-reflection area, and a surface of the external reflection area adjacent to said transmitting fiber inclined at a predetermined angle to the optical axis;
    an extinguishing area formed from said internal total-reflection area, and having an inclined surface at a predetermined angle to at least one side of surfaces adjacent to said transmitting fiber and said receiving fiber, and a surface of the external reflection area adjacent to said transmitting fiber inclined at a predetermined angle to the optical axis; and
    an extinguishing area formed from said internal total-reflection area, and having an inclined surface at a predetermined angle to at least one side of surfaces adjacent to said transmitting fiber and said receiving fiber.

2. A variable optical attenuator comprising:

a transmitting fiber for transmitting light;

a receiving fiber concentrically placed with said transmitting fiber for absorbing light;

a shutter between said transmitting fiber and said receiving fiber for absorbing light to adjust optical transmittance; and an actuator for driving said shutter;

wherein said shutter is made of silicon.

3. A variable optical attenuator comprising:

a transmitting fiber for transmitting light;

a receiving fiber concentrically placed with said transmitting fiber for absorbing light;

a shutter between said transmitting fiber and said receiving fiber for absorbing light to adjust optical transmittance; and an actuator for driving said shutter;

wherein said shutter functions as a waveguide.

4. A variable optical attenuator comprising:

a transmitting fiber for transmitting light;

a receiving fiber concentrically placed with said transmitting fiber for absorbing light;

a shutter between said transmitting fiber and said receiving fiber for absorbing light to adjust optical transmittance; and an actuator for driving said shutter;

wherein said shutter reflects a portion of light into a direction having no relation to an optical axis, and absorbs the remaining portion of light to extinguish light at a place having no relation to said transmitting or receiving fiber.

5. A variable optical attenuator comprising:

a transmitting fiber for transmitting light;

a receiving fiber concentrically placed with said transmitting fiber for absorbing light;

a shutter between said transmitting fiber and said receiving fiber for absorbing light to adjust optical transmittance; and an actuator for driving said shutter;

wherein said shutter reflects about 30% of light and absorbs about 70% of incident light.

6. A variable optical attenuator comprising:

a transmitting fiber for transmitting light;

a receiving fiber concentrically placed with said transmitting fiber for absorbing light;

a shutter between said transmitting fiber and said receiving fiber for absorbing light to adjust optical transmittance; and an actuator for driving said shutter;

wherein said shutter comprises an external reflection area, an internal total-reflection area and an extinguishing area from a leading end.

7. The variable optical attenuator according to claim 6, wherein said external reflection area is shaped as a wedge, and said internal total-reflection area and said extinguishing area are shaped as a rectangle.

8. The variable optical attenuator according to claim 6, wherein said external reflection area and said extinguishing area are shaped as a wedge, and said internal total-reflection area is shaped as a rectangle.

* * * * *